(12) United States Patent
Abdul Kadar et al.

(10) Patent No.: US 11,475,496 B1
(45) Date of Patent: Oct. 18, 2022

(54) PERSONALIZED TAXONOMY TO SUPPORT A VOICE-BASED INTERFACE ON A USER DEVICE

(71) Applicant: Amazon Technologies, Inc., Seattle, WA (US)

(72) Inventors: Feroz Abdul Kadar, Irvine, CA (US); Naila Khan, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 732 days.

(21) Appl. No.: 16/366,831

(22) Filed: Mar. 27, 2019

(51) Int. Cl.
*G06Q 30/06* (2012.01)
*G06F 16/28* (2019.01)
*G06F 16/2457* (2019.01)
*G10L 13/02* (2013.01)
*G06F 16/9535* (2019.01)
*G06F 16/248* (2019.01)

(52) U.S. Cl.
CPC ....... *G06Q 30/0617* (2013.01); *G06F 16/248* (2019.01); *G06F 16/24578* (2019.01); *G06F 16/287* (2019.01); *G06F 16/9535* (2019.01); *G06Q 30/0631* (2013.01); *G10L 13/02* (2013.01)

(58) Field of Classification Search
None
See application file for complete search history.

(56) References Cited

U.S. PATENT DOCUMENTS

| 6,778,982 | B1 * | 8/2004 | Knight | G06Q 10/10 |
| | | | | 707/999.001 |
| 10,360,265 | B1 * | 7/2019 | Agarwal | G06F 16/24522 |
| 2003/0063129 | A1 * | 4/2003 | Smyth | G06F 16/9535 |
| | | | | 715/810 |
| 2016/0350832 | A1 * | 12/2016 | Franklin | G06Q 30/0633 |
| 2018/0268818 | A1 * | 9/2018 | Schoenmackers | G10L 15/26 |
| 2019/0180358 | A1 * | 6/2019 | Nan | G06K 9/6269 |

OTHER PUBLICATIONS

Kun-Lung Wu, C. C. Aggarwal and P. S. Yu, "Personalization with Dynamic Profiler," Proceedings Third International Workshop on Advanced Issues of E-Commerce and Web-Based Information Systems. WECWIS 2001, 2001, pp. 12-20, doi: 10.1109/WECWIS.2001.933901., (Year: 2001).*

* cited by examiner

*Primary Examiner* — Michelle T Kringen
(74) *Attorney, Agent, or Firm* — Kilpatrick Townsend & Stockton LLP

(57) ABSTRACT

Techniques for enhancing functionalities of a voice-based user device are described. In an example a computer system generates, from a first taxonomy, a second taxonomy for a user based on an item purchase history. The computer system also identifies items based on this history and generates a list that associates the items with categories of the second taxonomy. Based on a user utterance, the computer system generates text-to-speech content from the list. This content includes category information and item information. The category information identifies a first category from the categories. The item information identifies a first item from the items, where this item is associated with the first category. The category information and the item information are presented to the user. The computer system adds an identifier of the first item to an item checkout process based on the presentation of the item information.

20 Claims, 11 Drawing Sheets

PERSONALIZED TAXONOMY TO SUPPORT A VOICE-BASED INTERFACE ON A USER DEVICE

BACKGROUND

As voice recognition technology improves, systems that employ such technology continue to proliferate. Some systems employ what is referred to as near-field voice recognition where a user speaks into a microphone located on a hand held device, such as a remote control or mobile device. Other systems employ far-field voice recognition where a user can speak to a device while the user is within the general vicinity of the device, e.g., within the same room, but not necessarily in close proximity to or even facing the device.

Such devices may be referred to as voice-based user devices. A voice-based user device generally provides the user with a voice-based interface to access various services. The voice-based user device may be limited to voice as the input modality.

BRIEF DESCRIPTION OF THE DRAWINGS

Various embodiments in accordance with the present disclosure will be described with reference to the drawings, in which.

DETAILED DESCRIPTION

Figure 1:
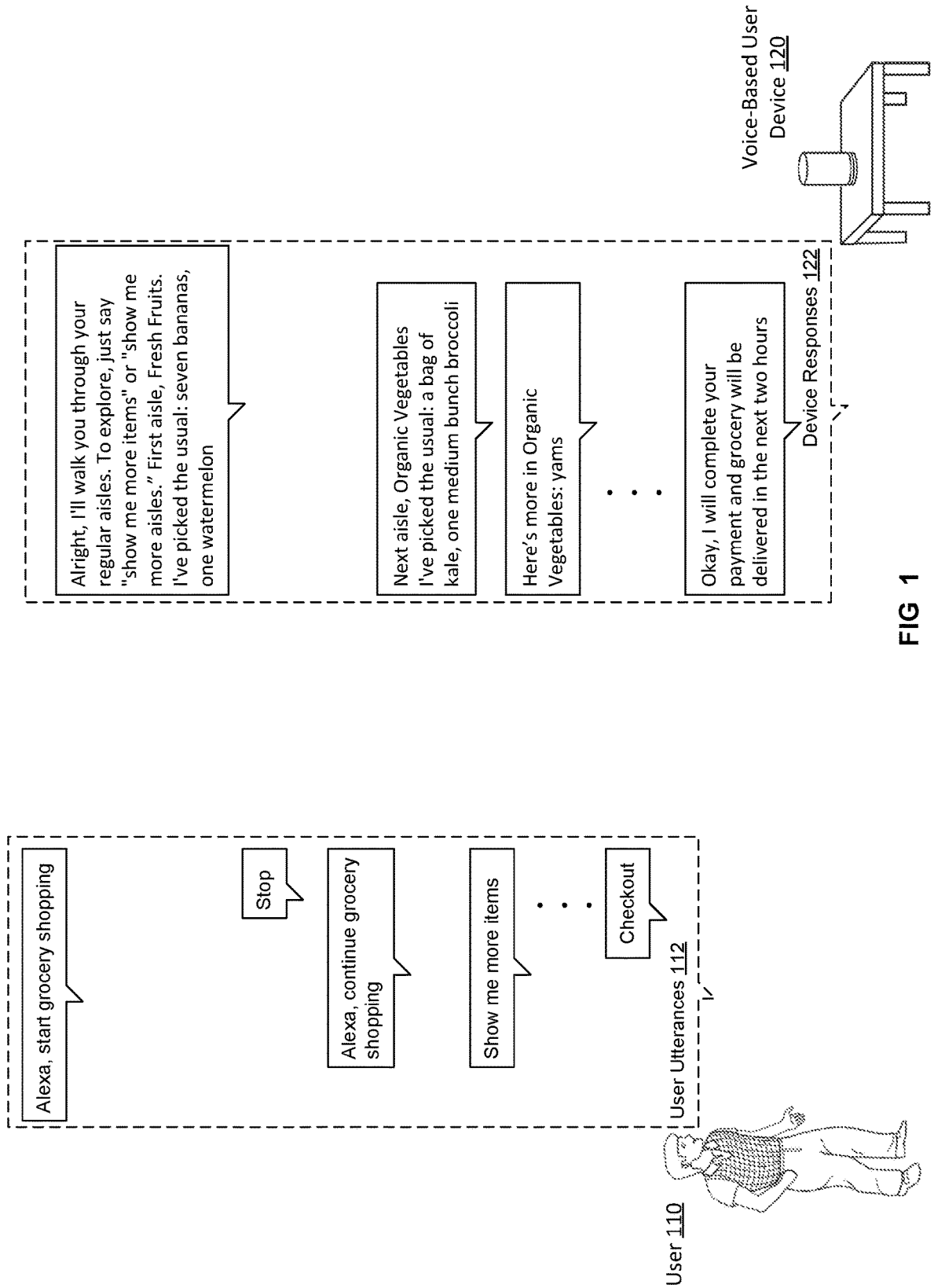
FIG. 1 illustrates example interactions between a user and voice-based user device in an item interaction session, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, enhancing functionalities of a voice-based user device by relying on an item taxonomy personalized for a user to drive the dialog between the voice-based user device and the user. In an example, a computer system may store a predefined taxonomy that organizes items available from one or more online resources in predefined categories. Using this predefined taxonomy to drive the user dialog may quickly degrade the user experience. Instead, the computer system may generate a personalized taxonomy based on a context of the user, such as the user's history of item interest. The computer system may also identify the items of interest from the context. In addition, the computer system may discover additional categories and items therein based on the same context but for other users. Although such discovered categories and discovered items may be relatively less interesting to the user, the user experience may be enhanced if related information is presented at the proper time. A list specific to the user may be generated, where this list may organize the items under categories of the personalized taxonomy and the discovered categories. The list may also rank the different categories and the items within each of the categories. The computer system may generate text-to-speech (TTS) content from the list. For instance, the TTS content may include category information identifying the categories and item information identifying the items. When presenting the TTS content, the voice-based user device may accordingly identify each category in a sequence depending on its relevance to the user and, upon the identification of a category, identify the items belonging to that category also in a sequence depending on their relevance to the user. While presenting about a category or at the end of this presentation, if the user asks for more information, the voice-based user device can present information about discovered items that belong to the category. Upon the presentation of the various categories, if the user asks for more information, voice-based user device can present information about discovered categories. Such construction of the user dialog based on the list customized according to the user's context provides an enhanced user experience that may not have been otherwise possible on the voice-based user device.

To illustrate, consider an example of purchasing grocery items from an online marketplace. Grocery items offered from this marketplace may be organized in a standard taxonomy, where each grocery item may belong to an aisle of the online marketplace (e.g., a predefined category of the standard taxonomy). Existing systems would allow the user to explore the entire standard taxonomy to add specific grocery items to a virtual cart in a purchase session. Alternatively, the existing systems would give the user the option to add the same grocery items from the last purchase session and then go through each of such items to update the virtual cart. In both situations, the user experience may quickly degrade when the standard taxonomy and/or number of items is large. For at least these reasons, voice-based user devices have not been typically configured to or used in purchase sessions involving large taxonomies or a large number of items.

Embodiments of the present disclosure support a configuration of a voice-based user device that can be used in purchase sessions involving large taxonomies or a large number of items. In other words, new functionalities can now be supported by the voice-based user device with a superior user experience. In particular, the user's purchase history may be analyzed to identify the user's regular aisles and the user's usual items under each regular aisle. A personalized taxonomy may be generated for the user, where the categories of this taxonomy corresponds to the regular aisles. In addition, the purchase history of other users that share a set of traits with the user (e.g., are located in a same region) may be analyzed to identify discovered aisles and discovered items. A list may be generated for the user, where the list organizes the usual items and the discovered items under the regular aisles and identifies the discovered aisles and the grouping of any additional discovered items under the discovered aisle. The list can also rank each category (e.g., regular or discovered aisle) and items (e.g., usual or discovered) within the category based on the potential interest level of the user. TTS content from the list is generated to drive a dialog that presents the categories and items according to their rankings. For instance, if the user is mostly like interested in oranges and lemons from an organic fruits aisle, then with whole milk and cheddar cheese from a dairy aisle, the TTS content would announce the organic fruits aisle first, identify the quantity and supplier of the oranges followed by those of the lemons, then announce the dairy aisle, and identify the quantity and supplier of the whole milk followed by those of the cheddar cheese. When an item is presented, the virtual cart of the user may be automatically updated to add the item. If the user requests removal of the item, the TTS content is paused, the item is removed, an announcement about the removal is made, and the TTS content may resume. If the user requests additional item information under a regular aisle, discovered items of that aisle may be presented to the user. If the user requests additional aisle information, discovered aisles may be presented to the user. The TTS content may trigger the user to make such requests by, for instance, asking the user if they would like the additional item information at the end of the presentation about the regular aisle and if they would like the additional aisle information at the end of the presentation about the regular aisles. In this way, the dialog would appear as a sequential walk through the regular aisles and the usual items with opportunities to receive additional discovery information. Such user experience would bring the familiarity of the user's purchase habit into the dialog.

Embodiments of the present disclosure provide multiple advantages over existing systems. For example, the use of a personalized taxonomy and a personalized list allows the creation of TTS content that is personalized to a user. This TTS content may be presented on a voice-based user device for voice interfacing with the user. Absent such TTS content, the voice-based user device may not be usable in an item interaction session that involves a large standard taxonomy or a large number of items. Hence, the personalized taxonomy and the personalized list enable the addition of new functionality to the voice-based user device at a high user experience quality level. In another example, the input modality of the voice-based user device may be enhanced because, now, this device may support functionalities that otherwise would be available on only graphical user interface (GUI) user devices. In other words, in the presence of a large standard taxonomy or a large number of items, existing systems may only be efficient when a GUI interface is available. In comparison, here, the voice interface of the voice-based interface can be used at least at the same level of efficiency as the GUI interface.

FIG. 1 illustrates example interactions between a user 110 and voice-based user device 120 in an item interaction session, in accordance with various embodiments. As illustrated, the item interaction session corresponds to a dialog between the user 110 and the voice-based user device 120 to shop grocery items. The item interaction session may be supported by communications between the voice-based user device 120 and a backend system as further illustrated in FIG. 2.

In an example, the voice-based user device 120 can be any suitable computing device including one or more processors, one or more memories, and one or more interfaces for executing one or more applications, interacting with the user 110, interfacing with remote computing devices, and the like, where the interface(s) include a voice-based interface. For instance, the voice-based user device 120 may be a smart speaker providing an intelligent personal assistant service responsive to a wakeword and capable of different interactions including content playing, providing real-time information, and performing tasks and routines. In another illustration, the voice-based user device 120 may be any other computing device hosting an intelligent personal assistant service and/or other applications. For instance, the computing device 210 can be a mobile phone, a tablet, a desktop computer, a smart television, or any other user device having one or more processors, one or more memories, and a voice-based interface.

Generally, the voice-based user device 120 may perform natural language processing on a user utterance (e.g., "Alexa, start grocery shopping") of the user 110. If this processing indicates that the user utterance includes a wakeword of the voice-based user device 120 (e.g., such as "Alexa"), the voice-based user device 120 may proceed locally with an intent analysis of the user utterance and/or may send audio representing the user utterance to the backend system for analysis thereat. In both cases, the user intent may be determined as requesting the item interaction session (e.g., grocery shopping). Accordingly, dialog between the voice-based user device 120 and the user 110 may be performed.

The dialog may include device responses of the voice-based user device 120 and user utterances 112 of the user 110. For instance, the voice-based user device 120 may present different categories and items belonging to the categories to the user 110 (e.g., grocery aisles and grocery items). In addition, the voice-based user device 120 may maintain a context of the dialog such that to continue, pause, return to, or exit the dialog depending on one or more of the user utterances 112. The user 110 may request additional information about items, removal of items from an item checkout process (e.g. a virtual cart), the presentation of additional items and/or additional categories, and the like.

In an illustration, each category corresponds to a grocery aisle. The categories are personalized for the user 110, where each category may be a regular grocery aisle or a discovered grocery aisle. A regular grocery aisle may represent a grocery aisle that the user 110 may regularly purchase items from, where this regularity may be determined based on the user's 110 item purchase history. In other words, the regular aisle may be a repeat category of grocery items of potential interest to the user, where the user may repeatedly visit this category over time. Collectively, the regular aisles may represent the minimal ranked list of categories of grocery items that together provide maximal coverage of grocery items most likely to be purchased by the user 110 at the time of the dialog with the voice-based user device 120. A discovered aisle may represent a grocery aisle that the user 110 less frequently purchases items from, but where other users that share the same context with the user 110 (e.g., are located in the same region) may tend to use, where the trend may be determined from the item purchase history of the users. In other words, the discovered aisle may be a particular category of grocery items of relatively less potential interest to the user but that the user may still have some interest to review upon reviewing their regular aisles.

Similarly, each item corresponds to a grocery item that belongs to one of the grocery aisles. An item may be a usual item or a discovered item. A usual item may represent a grocery item that the user 110 may regularly purchase, where this regularity may be determined based on the user's 110 item purchase history. In other words, the regular item may be a repeat grocery item of potential interest to the user, where the user tends to repeatedly by this item over time. Collective, the usual items may represent an ordered collection of grocery items ranked by highest likelihood of purchase within each category. A discovered item may represent a grocery item that the user 110 less frequently purchases but where the other users may tend to purchase, where the trend may be determined from the item purchase history of the users. In other words, the discovered item may be a particular grocery item of relatively less potential interest to the user but that the user may still have some interest to review upon reviewing their usual items.

In this illustration, the dialog may be structured to support generating a large basket of grocery items, personalizing the shopping experience, and allowing meaningful discovery of grocery items. The dialog structure may support a full walk-through, where if not interrupted, the voice-based user device 120 may build a complete basket of the usual items one regular aisle at a time. The dialog structure may also support interrupts for more items, where the user 110 may interrupt the voice-based user device 120 to add a discovered item from the current aisle, and have voice-based user device 120 continue shopping after the interruption. Further, the dialog structure may explore the grocery store, where the user 110 can explore discovered aisles at any time. In addition, the dialog structure may individualize the user experience, where the ordering of aisles and items may be personalized in order to maximize relevance and speed and, therefore, convenience. Cart awareness may also be provided, where the dialog structure may allow the user 110 to continue shopping across different modalities like website and mobile application.

For instance, the voice-based user device 120 may present the regular aisles in a sequential manner, where the regular aisles are presented in a descending order of the user's 110 level of interest in these regular aisles. The presentation of each regular aisle may include a sequential presentation of usual items, where also the usual items are presented in a descending order of the user's 110 level of interest in these usual items. Once the voice-based user device 120 presents a regular item, an identifier of this item may be added to the item checkout process (e.g., the item may be added to the virtual cart of the user 110). The user 110 can request removal of the item from the item checkout process or an edit thereto (e.g., change the quantity and/or supplier). At the end of the presentation of a regular aisle, the voice-based user device 120 may ask whether the user 110 would like to discover items belonging to the regular aisle. If the user 110 affirms, the voice-based user device 120 may present discovered items belonging to the regular aisle and add any of such discovered items to the item checkout process if the user 110 requests the addition. Otherwise, the voice-based user device 120 may present the next regular aisle. At the end of the presentation of the regular aisles, the voice-based user device 120 may ask whether the user 110 would like to discover aisles. If the user 110 affirms, the voice-based user device 120 may present discovered aisles also in a sequential manner and the related discovered items. Upon a user request to add a discovered item, this item may be added to the item checkout process. At any point in time, the user can request the completion of the item checkout process, to exit the dialog, to return to the dialog (if previously exited), to review the items added to the item checkout process, to edit these items (e.g., their quantities and/or suppliers), explore additional items and aisles that were not discovered, and/or perform other item-related tasks. In addition, the item checkout process (e.g., the virtual cart) can be associated with a user account of the user 110. In this way, if the user 110 starts and/or continues the shopping mission on another user device associated with the user account, the item checkout process would be updated and the dialog can take into account such updates. For instance, if the item checkout process was started from the other device and a regular item was already added, when the dialog with the voice-based user device 120 is conducted, the voice-based user device 120 may not present this item again (or may indicate that it is already in the virtual cart) and may not re-add this item to the item checkout process.

Below is an illustrative example of the dialog, where "Customer" represents the user 110 and "Alexa" represents the voice-based user device 120.

*Customer:* Alexa, start grocery shopping
*Alexa:*
    Alright, I'll walk you through your regular aisles
    To explore, just say "show me more items" or "show me more aisles".
    First aisle, Fresh Fruits.
    I've picked the usual: seven bananas, one watermelon, one pound of strawberries, . . . , and a bag of clementines.
    Next aisle, Fresh Vegetables.
    I've picked the usual: two eggplants, one cauliflower, two bags of spinach, . . . , and one pound of brussel sprouts
*Customer:* Alexa, stop.
[some time later]
*Customer:* Alexa, continue grocery shopping
*Alexa:*
    Next aisle, Meat.
    I've added the usual: . . .
*Customer:* Show me more items
*Alexa:*
    Here are some other items in Meat
    Chicken Breast, Chicken Drumsticks, . . .
    [Customer can interrupt the list to add an item]
*Customer:* continue shopping
*Alexa:*
    Next aisle, . . .
    I've added the usual: . . .
*Customer:* Show me more aisles
*Alexa:*
    Here are some other aisles we haven't visited in some time
    Frozen Foods, Alcohol, Gift Cards, . . .
*Customer:* Show me items in Frozen Foods
*Alexa:*
    Here are some items in Frozen Foods
    [Customer can interrupt the list to add an item]
    . . .
*Customer:* Checkout!

Figure 2:
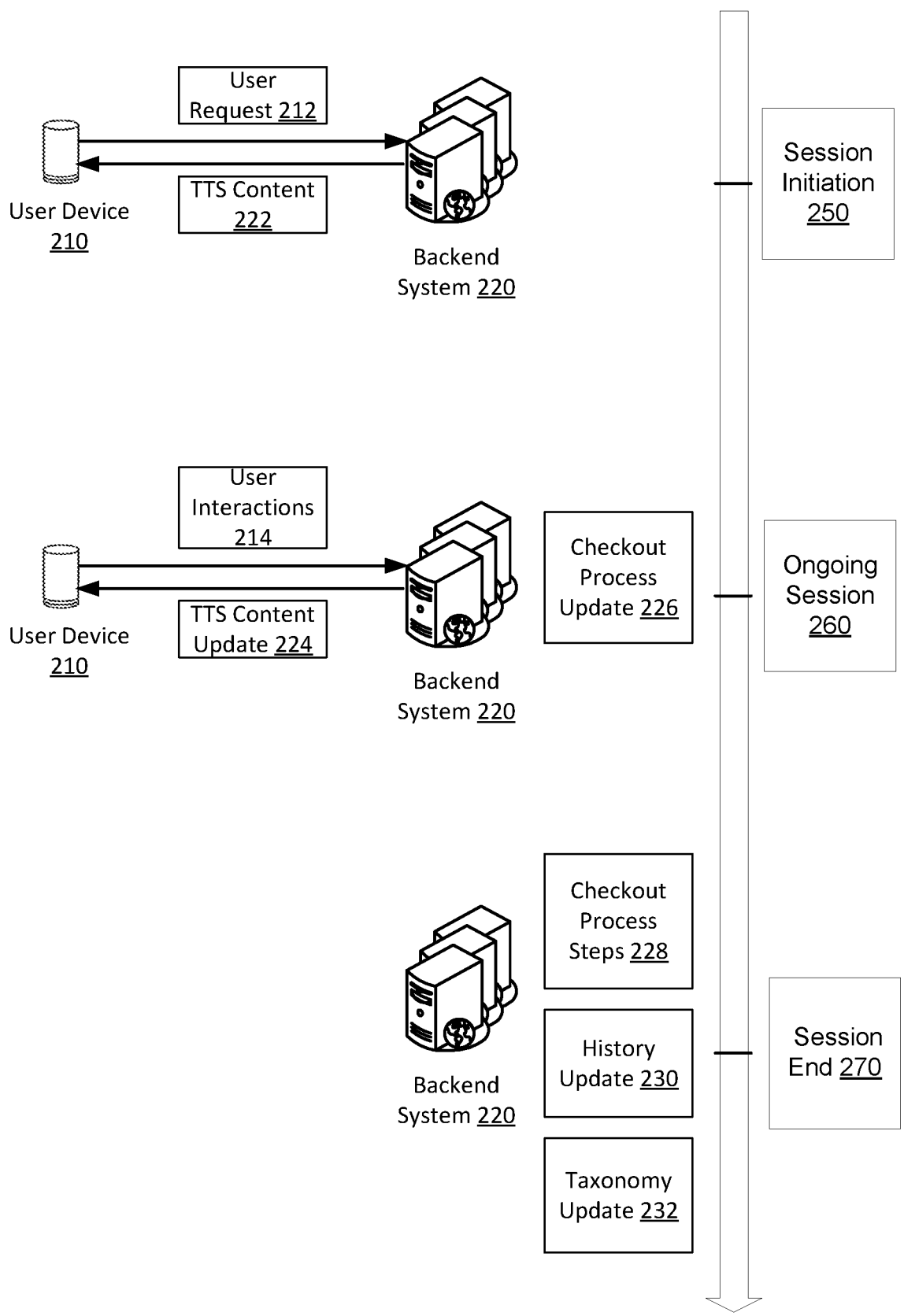
FIG. 2 illustrates an example user device and an example backend system to support an item interaction session, in accordance with various embodiments.

FIG. 2 illustrates an example user device 210 and an example backend system 220 to support an item interaction session, in accordance with various embodiments. As illustrated, the item interaction session may involve multiple stages, such as a session initiation 250, an ongoing session 260, and a session end 270. The session initiation 250 may involve setting up the dialog between the user device 210 and a user, where this dialog supports generating a large basket of items, personalizing the user experience, allowing meaningful discovery of additional items, and maintaining cart awareness. During the ongoing session 250, the dialog may be presented to the user and user interactions may be received, where a full walk-through, interrupts, and item discoveries are supported. Upon the session end 270, the item interaction session may terminate and additional steps of the item checkout process may be performed.

In an example, the user device 210 may be an example of the voice-based user device 120 of FIG. 1. The backend system 220 may include a set of computer servers that supports a voice-based interface of the user device 210. For instance, such computer servers may support natural language understanding (NLU) processing and automatic speech recognition (ASR). The computer servers may also provide the dialog by supporting the definition of regular and discovered categories and items and the related text-to-speech (TTS) content. An example architecture of the backend system 220 is further illustrated in FIG. 3.

As illustrated, the user device 210 may send a user request 212 to the backend system 220. In an example, the user request 212 may include audio data representing a user utterance requesting the item interaction session. For instance, the user device 210 may receive the user utterance from the user. Upon detecting a wakeword (e.g., "Alexa"), the user device 210 may package and send the audio data representing the utterance to the backend system 220.

Upon receiving the audio data, the backend system 220 may apply automatic speech recognition (ASR) processing to the audio data to generate text data. The text data can be provided for natural language understanding (NLU) processing that analyzes the text data in order to determine the intent of the spoken utterance, which can be provided as intent data. Accordingly, the backend system 220 may determine an intent of the user for a specific type of item interaction (e.g., to shop grocery items). The backend system 220 and the user device 210 may accordingly establish a communications session that is associated with this intent, thereby performing the session initiating 250. The communications session for a specific type of item interaction may be referred to herein as "an item interaction session."

Based on personalized categories (whether regular or discovered) and on personalized items (whether usual or discovered), the backend system 220 may generate and send TTS content 222 to the user device 210. The personalization may rely on a taxonomy specific to the user, where the taxonomy is generated based on the user's item purchase history. In turn, the user device 210 may start the presentation of the TTS content to the user, thereby performing the dialog during the ongoing session 260.

During the ongoing session 260, the user device 210 may receive additional user utterances and may send corresponding user interactions 214 to the backend system 220. Each user interaction 214 may include audio data corresponding to a user request for editing an item added to the checkout process, exploring discovered aisles or items, exploring additional aisles or items, pausing, returning, or exiting the dialog. Here also, the backend system 220 may receive the audio data and perform ASR and NLU processing to determine the intent of the user, perform an update 224 to the TTS content and send the updated TTS content to the user device 210 as applicable, perform an update 226 to the item checkout process as applicable, and/or perform any other tasks relevant to the user interactions 214.

Upon determining a user intent to complete the item checkout process (e.g., based on audio data from the user device 210 indicating this intent such as "complete the checkout"), the backend system 220 may terminate communications session with the user device 210. Upon the session end 270, the backend system 220 may perform any remaining steps 228 of the item checkout process (e.g., generating a purchase order, updating a user account, etc.), update an item purchase history 230 of the user (e.g., by including identifiers of the purchased items under the user account), and update the taxonomy specific to the user based on the update to the item purchase history 230.

Figure 3:
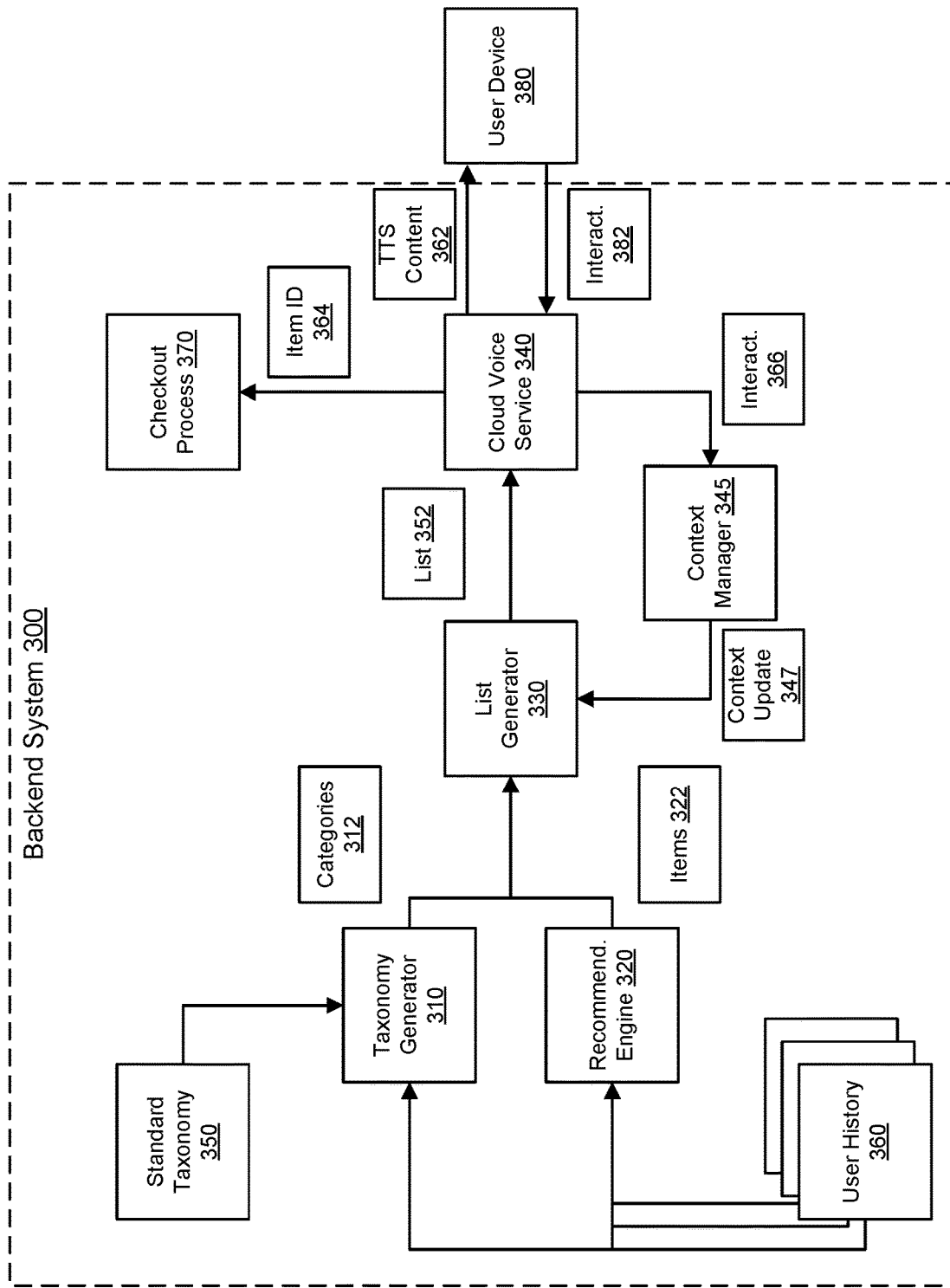
FIG. 3 illustrates an example architecture of a computer system to support an item interaction session, in accordance with various embodiments.

FIG. 3 illustrates an example architecture of a computer system to support an item interaction session, in accordance with various embodiments. The computer system may include a backend system 300 and a user device 380, similar to the backend system 220 and the user device 210, respectively, of FIG. 2. Generally, the backend system 300 may generate and send TTS content to the user device 380 in an item interaction session. The user device 380 may present the TTS content in a dialog with the user and send user interactions to the backend system 300 in the item interaction session for TTS content updates, user history updates, taxonomy updates, and/or checkout process updates.

In an example, the backend system may include a taxonomy generator 310, a recommendation engine 320, a list generator 330, a cloud voice service 340, and a context manager 345. The backend system 300 may also maintain a standard taxonomy 350 and a user history 360 per user (or user account). In addition, the backend system 300 may interface with or include a checkout process 370. Each of these components is further described herein next.

Figure 4:
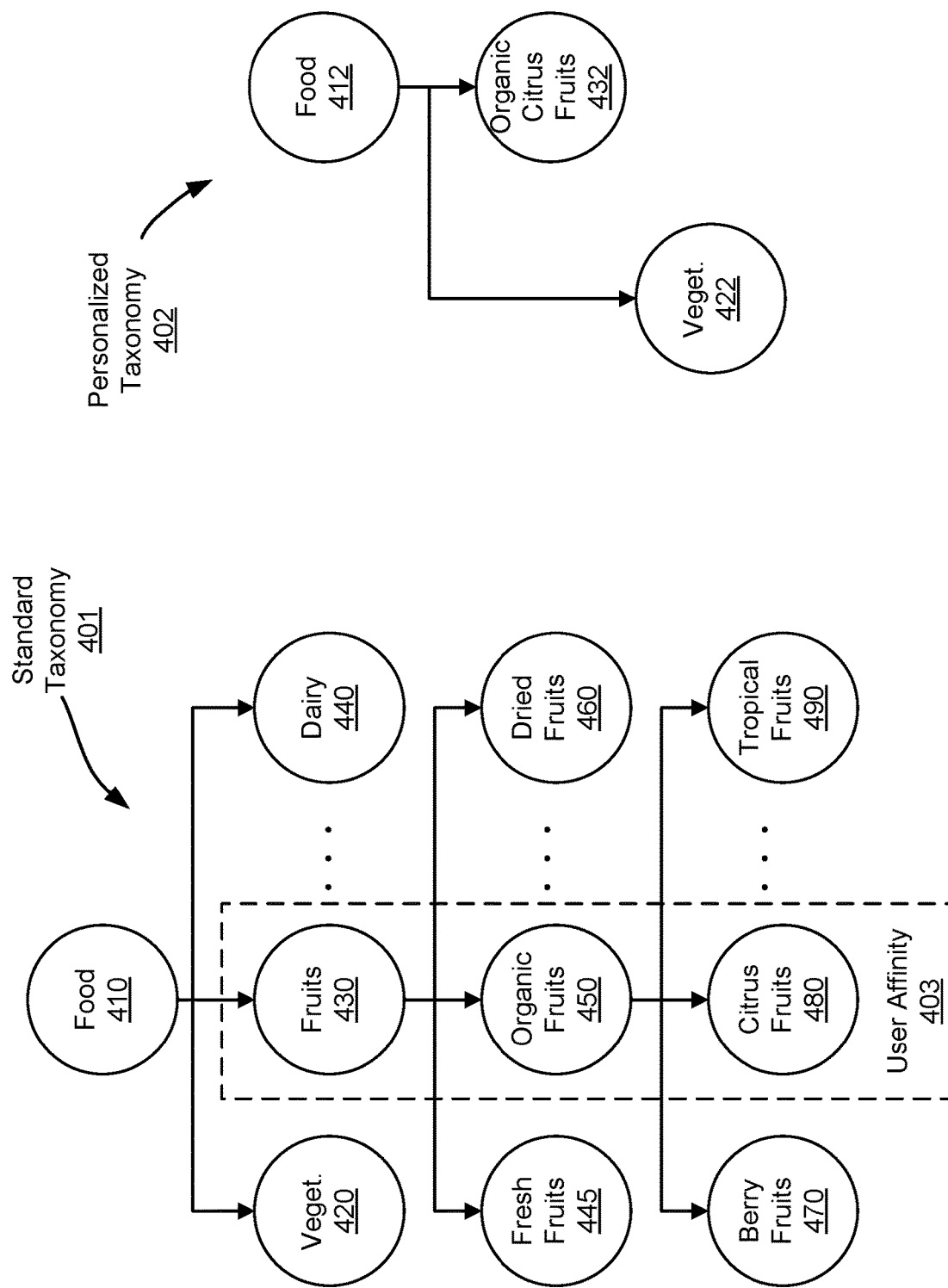
FIG. 4 illustrates an example standard taxonomy and an example personalized taxonomy, in accordance with various embodiments.

The standard taxonomy 350 may represent a taxonomy of items available from an online platform, such as grocery items available from an online grocery store. This taxonomy 350 may be defined independently of the users and dependently on the online platform. Generally, the standard taxonomy 350 may include predefined categories. The available items may be organized under such categories. FIG. 4 illustrates an example of the standard taxonomy 350.

A user history 360 of a user may include a history of how the user interacted with items available from the online platform (e.g., a user interaction history). For example, the user history 360 may include a purchase history of items by the user from the online platform. This history 360 may be stored under the user account of the user.

For a user, the taxonomy generator 310 may generate categories of interest to the user. These categories may form a personalized taxonomy, as further illustrated in FIG. 4. To do so, the user history 360 specific to the user and the standard taxonomy 350 may be input to the taxonomy generator 310. This generator 310 may analyze the user history 360 to identify items that are of potential interest to the user and may look up the standard taxonomy 350 to identify the categories corresponding to these items. These categories may represent the categories 312 of interest to the user. In an example, the analysis may involve pattern recognition and/or machine learning. The taxonomy generator 310 may also identify, as an output, a level of interest of the user in a category. The levels of interest may be used to rank the categories 312. For instance, if pattern recognition based on purchase frequency is used, the higher the purchase frequency of items belonging to a category, the higher the level of interest in that category may be. Categories having a level of interest over a first category threshold may represent regular categories.

In addition to identifying regular categories, a similar process may be used to identify discovered categories. In particular, the backend system 300 may identify other users that share at least one context common with the user. For instance, this context may be a geographic region. The user histories 360 of such users may be input to the taxonomy generator 310, where the taxonomy generator 310 may process these histories 360 through the pattern recognition and/or machine learning. An identified category having a level of interest over a second category threshold (e.g., one that is lower than the first category threshold) and that is not a regular category may be determined to be a discovered category.

For the user, the recommendation engine 320 may identify items 322 of interest to the user. To do so, the user history 360 specific to the user may be input to the recommendation engine 320. This engine 320 may analyze the user history 360 to identify the items 322 that are of potential interest to the user. The levels of interest may be used to rank the items 322. For instance, if pattern recognition based on purchase frequency is used, the higher the purchase frequency of an item, the higher the level of interest in that item may be. Items having a level of interest over a first item threshold may represent usual items. Seasonality and availability of an item may also be factors used by the recommendation engine 320. For instance, if the item is no longer in season, the item may be filtered out. Or, if the item is now in season, a weight for recommending the item (e.g., the level of interest) may be increased. Similarly, if an item is unavailable from the online platform (e.g., because of a stock out), the recommendation engine 320 may identify a substitute item.

In addition to identifying usual items, a similar process may be used to identify discovered items. The user histories 360 of the users having the common context may be input to the recommendation engine 320, where the recommendation engine 320 may process these histories 360 through the pattern recognition and/or machine learning. An identified item having a level of interest over a second item threshold (e.g., one that is lower than the first category threshold) and that is not a usual item may be determined to be a discovered item.

The list generator 330 may receive the categories 312 (including the regular and discovered categories) and the corresponding levels of interest from the taxonomy generator 310. In addition, the list generator 330 may receive the items 322 (including the usual and discovered items) and the corresponding levels of interest from the recommendation engine 320. Receiving a category or an item may represent receiving an identifier of the category or the item. Based on these inputs, the list generator 330 may generate a list 352 that is personalized to the user. An example of generating the list is further illustrated in FIG. 5 and an example of the list 352 is further illustrated in FIG. 6. Briefly, the list 352 may be generated based on associations between the items 322 with predefined categories of the standard taxonomy and a mapping between these predefined categories with the categories 312 defined for the user.

Generally, the list 352 associates the items 322 with the categories 312. For instance, the list 352 may group the usual items under the regular categories and the discovered items under the regular and discovered categories. In addition, the list 352 may organize the regular categories and the discovered categories in an ordered sequence based on the corresponding user levels of interest in the categories. Similarly, the list 352 may organize the items under a category in an ordered sequence based on the corresponding user levels of interest in the items.

In an example, the list generator 330 may generate the list 352 just in time such that this list 352 may represent the user interests at the time of the dialog between the user and the user device 380. In particular, upon an initiation of an item interaction session, the list generator 330 may generate the list 352 based on application programming interface (API) calls to the taxonomy generator 310 and the recommendation engine 320 to receive the most current categories 312 and items 322. In another illustration, at some predefined interval (e.g., on a nightly basis), the most current categories 312 and items 322 may be sent to the list generator 330 and the list generator 330 may generate and store the list 352 for use upon a next dialog between the user and the user device 380.

The cloud voice service 340 may receive the list 352 from the list generator 330 and interactions 382 from the user device 380. The cloud voice service 340 may include a natural language processing system and a communications system. The received interactions 382 may include audio data representing user utterances and presentation data indicating that an item and/or category was presented to the user. The natural language processing system may determine the user intent from the audio data. Upon audio data indicating a request for the item interaction session, the communications system may setup a communications session with the user device 380 for the related subsequent interactions. In addition, the natural language processing system may request the list 352 from the list generator 330 and may generate TTS content 362 from the list 352. The TTS content 362 may be sent to the user device 380 in the communications session. Upon presentation data indicating that an item was presented to the user, the cloud voice service 340 may send an identifier 364 of the item to the checkout process 370, thereby adding the item to the checkout process 370. If additional audio data indicates a use request to remove or edit the item, cloud voice service 340 may update the checkout process 370 by removing the identifier 364 or requesting edits associated with this identifier 364 (e.g., to update the quantity and/or supplier of the item).

The TTS content 362 may include category information and item information. The category information may identify the categories in an ordered sequence based on the corresponding user levels of interest in the categories. The item information may identify the items under each category in an ordered sequence based on the corresponding user levels of interest in the items.

The user device 380 may receive the TTS content 362 and present the category according to the category's ordered sequence. After identifying a particular category to the user and before presenting the next category, the user device 380 may present the items belonging to the particular category according to the items' ordered sequence. If no user interruption is detected upon presenting an item, the user device 380 may send presentation data to the cloud voice service 340 indicating this presentation to thereby add the item to the checkout process 370. If a user utterance is detected, the corresponding audio data may be sent to the cloud voice service 340 to thereby update the checkout process 370 and/or TTS content 362, pause the communications session, return to the communications session, exit the communications session, and/or trigger the next septs of the checkout process 370 as applicable.

The context manager 345 may maintain a context of the dialog. For instance, the context manger 345 may determine what items and/or categories from the list 352 have been presented such that, when the dialog is paused, resumed, or altered, the relevant information about remaining items and/or categories may be presented. In an example, the context manager 345 may receive interaction data 366 from the cloud voice service 340 indicating the user interactions and the information that has been presented so far or the latest information that was presented. Based on the interaction data 366, the context manager 345 may track the context of the dialog and provides a context update 347 to the list generator 330. In turn, the list generator 330 may update the list 352 to indicate the information that has been presented, thereby allowing the dialog to progress according to the information that should be presented next (e.g., remaining information about items and/or categories depending on their rankings).

FIG. 4 illustrates an example standard taxonomy 401 and an example personalized taxonomy 402, in accordance with various embodiments. The standard taxonomy 401 may be input to a taxonomy generator, such as the taxonomy generator 310 of FIG. 3. The personalized taxonomy may be an output of the taxonomy generator, where this output may be personalized to a user based on the history of the user and of the histories of other users that share one or more contexts with the user. In the interest of clarity of explanation, FIG. 4 illustrates the two taxonomies 401 and 402 in connection with grocery items available from an online grocery store. However, the embodiments are not limited as such and similarly apply to other types of items available from other types of online platforms.

In an example, the standard taxonomy 401 may organize the available items in a top-down hierarchy of predefined categories. The top level of the hierarchy may include a parent node (illustrated as "Food 410") for all other nodes, where this parent node may represent a top category. At any level of the hierarchy, a node may be connected to a parent node from the most immediate higher level. The interconnection may indicate that the node may be a sub-category of the category represented by the parent node. If a particular node has no children nodes, that node may correspond to an available item, where the item belong to the category represented by the parent node of this particular node.

As illustrated, the "Food 410" category may include multiple sub-categories at a same hierarchical level, such as "Vegetables 420," "Fruits 430," and "Dairy 440." In turn, each of these categories may include multiple sub-categories at a next hierarchical level. For instance, the "Fruits 430" category may include "Fresh Fruits 445," "Organic Fruits 450," and "Dried Fruits 460" sub-categories. Similarly, the "Organic Fruits 450" may include "Berry Fruits 470," "Citrus Fruits 480," and "Tropical Fruits 490," and so on and so forth. At the end of a category, grocery items belonging to that category may be connected. For instance, lemons, oranges, and clementines may be connected to the "Citrus Fruits 480" category.

The user history (or, similarly, user histories) may be analyzed to determine the user affinity 403 (e.g., levels of interest) in the predefined categories of the standard taxonomy 401. For instance, the history of grocery item purchases may indicate that the user may frequently buy fruits, including fresh fruits and organic fruits and that, most of the purchased fruits fall under the Citrus Fruits 480 category belonging to the Organic Fruits 450. Hence, the user affinity 403 may indicate a general interest of the user in fresh and organic fruits and a particularly high interest of the user in citrus fruits that are organic. Accordingly, a personalized category may be generated for the user to indicate this affinity 403. FIG. 4 illustrates this category as "Organic Citrus Fruits 432."

In other words, the personalized taxonomy 402 may organize categories of interest to the user in a top-down hierarchy. Categories at the same level may indicate a same interest of the user in these categories. The categories need to correspond one-to-one with the predefined categories of the standard taxonomy 401. For instance, multiple predefined categories may be combined or collapsed to define a single personalized category (e.g., "Fruits 430," "Organic Fruits 450," and "Citrus Fruits 480" may be combined to define "Organic Citrus Fruits 432" based on the user affinity 403"). In addition, grocery items that belong to the predefined categories may not be grouped under the personalized categories. Instead, the personalized categories may remain empty and grocery items may be subsequently associated with them in a list.

As illustrated, the personalized taxonomy 402 may include a top-level "Food 412" category. The next level may include the "Organic Citrus Fruits 432." A lower level may include "Vegetables 422," indicating that the user has higher interest in organic citrus fruits 432 than vegetables. Of course, each personalized categories may include multiple sub-categories.

Figure 5:
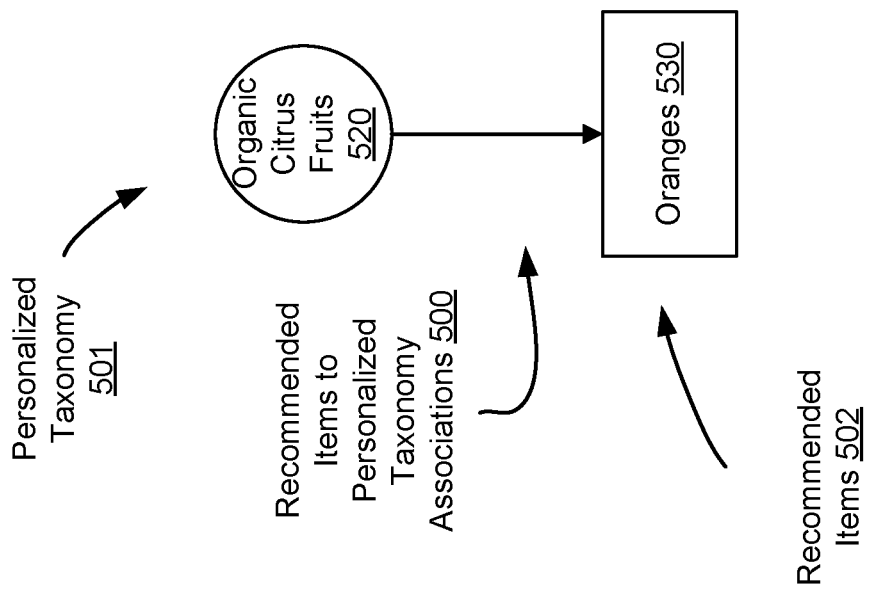
FIG. 5 illustrates examples of recommended items and personalized taxonomy associations, in accordance with various embodiments.

FIG. 5 illustrates examples of recommended items and personalized taxonomy associations 500, in accordance with various embodiments. In an example, recommended items 502 may be identified by a recommendation engine, such as the recommendation engine 320 of FIG. 3, and may include usual and discovered items. In comparison, a personalized taxonomy 500 may be generated by a taxonomy generator, such as the taxonomy generator 310 of FIG. 3, and may include regular and discovered categories. The associations 500 may associate the recommended items 502 with the personalized taxonomy 501 by, for instance, grouping these items 502 under the proper categories of the personalized taxonomy 501.

In an example, an association of a recommended item with a personalized category may be performed based on a membership of the recommended item with a predefined category of a standard taxonomy and a mapping between the standard taxonomy and the personalized taxonomy. This mapping may indicate that the personalized category is mapped to the predefined category. Based on this indication and the item membership, the recommended item may be grouped under the personalized category.

To illustrate, consider an example of Oranges 530. The Oranges 530 may belong to a Citrus Fruit category under an Organics Fruit category of the standard taxonomy (e.g., the "Citrus Fruits 480" and "Organic Fruits 450" categories of FIG. 4). The mapping may indicate that the "Organic Citrus Fruits 520" of the personalized taxonomy 501 is mapped to the two predefined categories. Accordingly, an association 500 may be generated, whereby the Oranges may be grouped under the "Organic Citrus Fruits 520" of the personalized taxonomy 501.

Figure 6:
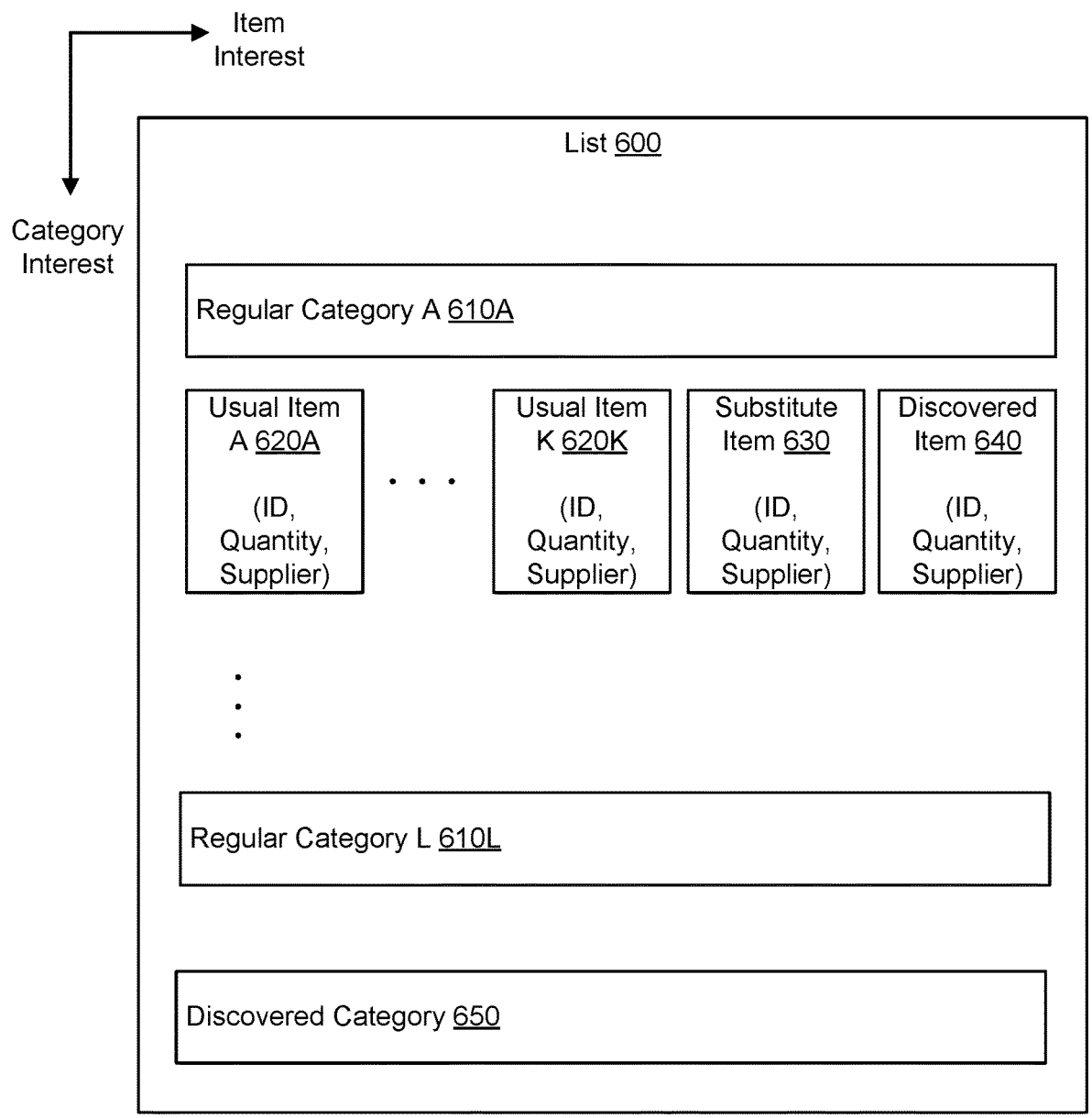
FIG. 6 illustrates an example list based on recommended items and personalized taxonomy associations, in accordance with various embodiments.

FIG. 6 illustrates an example list 600 based on recommended items and personalized taxonomy associations, in accordance with various embodiments. The list 600 may associate the recommended items (e.g., whether usual or discovered) with categories (whether regular or discovered), may rank the categories, and may rank the items within each category.

For illustrative purposes, the ranking is shown along the vertical and horizontal axes, although other ways to define the ranking is possible (e.g., by maintaining a score or some indicator (e.g., high, medium, low) for each category and each item). The categories may be ranked vertically in a descending order from top to bottom based on the user's level of interest in the category, where the lower the category is, the lower the user's level of interest in the category. The items may be ranked horizontally in a descending order from left to right based on the user's level of interest in the items, where the more to the right the item is, the lower the user's level of interest is in the item.

As illustrated, the list 600 may identify a plurality of regular categories 610A through 610L. The first regular category 610A may be ranked higher than the next regular category and so on and so forth until the last regular category 610L. After the last category 610L, the list 600 may identify one or more discovered categories (FIG. 6 shows a single discovered category 650 although a plurality of them is possible). If multiple discovered categories exist, the list 600 may similarly rank them depending on the user's level of interest. Being ranked lower than the last regular category 610L may indicate that the discovered category 650 is of lower interest to the user relative to the regular categories.

Under the regular category 610A (and similarly under each of the other categories), the list 600 may identify usual items 620A through 620K, one or more substitute items 630, and one or more discovered items 640, as applicable. The usual items 620A through 620K may be ranked higher than the substitute item(s) 630 in turn ranked higher than discovered item(s) 640, thereby indicating that the user may be interested most in usual items, than substitute items, and finally discovered items. For each type of item (e.g., usual, substitute, and discovered), the list 600 may also order these items according to the user's level of interest. For instance, the usual item 620A is ranked higher than the usual item 620K indicating that the usual item 620A is of relatively more interest to the user. For each of the items, the list 600 may include an identifier of the item (e.g., an item ID such as a product number), a quantity of the items (e.g., a particular quantity to add to a checkout process), and/or a supplier of the item (e.g., a particular supplier to use if multiple suppliers exist and use the same item ID).

FIGS. 7-10 show illustrative flows for managing a dialog between a user device and a user, in accordance with various embodiments. Some or all of instructions for performing the operations of the illustrative flow can be implemented as hardware circuitry and/or stored as computer-readable instructions on a non-transitory computer-readable medium of a computer system, such as the computer system of FIG. 3. As implemented, the instructions represent modules that include circuitry or code executable by a processor(s) of the computer system. The use of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

Figure 7:
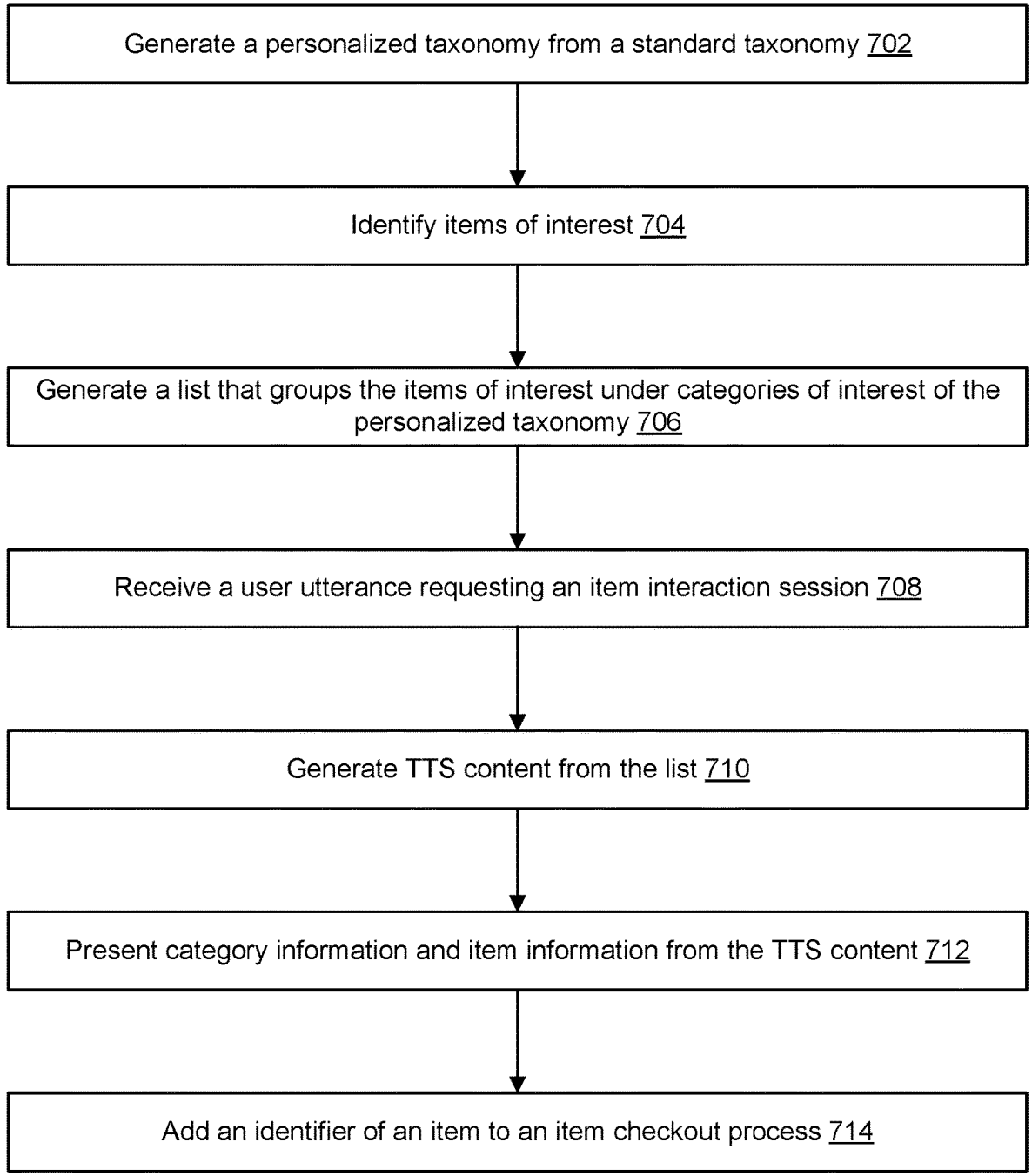
FIG. 7 illustrates an example flow for presenting text-to-speech (TTS) content in an item interaction session, in accordance with various embodiments.

FIG. 7 illustrates an example flow for presenting text-to-speech (TTS) content in an item interaction session, in accordance with various embodiments. In an example, the example flow may start at operation 702, where the computer system may generate a personalized taxonomy for the user from a standard taxonomy of predefined categories. For instance, the standard taxonomy is defined for items available from an online platform. An item purchase history of the user may include past purchases for some of the available items. This history and the standard taxonomy may be input to a taxonomy generator of the computer system. An output may include the personalized taxonomy, where this taxonomy may include categories of interest to the user, such as regular categories. In addition, other users sharing a same context as the user may be identified. Their item purchase histories may also be input to the taxonomy generator. In this case, the output may further include additional categories that may be relatively of less interest to the user, such as discovered categories. The output may also identify the corresponding levels of interest of the user in the different categories.

At operation 704, the computer system may identify items of interest to the user from the available items. For instance, the item purchase history of the user is input to a recommendation engine of the computer system. An output may identify the items of interest. In addition, the item purchase histories of the other users may be input to the recommendation engine. In this case, the output may further include potential items that may be relatively of less interest to the user, such as discovered items. The output may also identify the corresponding levels of interest of the user in the different items.

In an example, the recommendation engine may consider the seasonality of an item. In particular, the item may be available from the online platform for an availability timeframe (e.g., the month of June). A portion of the item purchase history corresponding to the availability timeframe (e.g., purchases made in the month of June from previous years) may be analyzed to determine the user's level of interest in the item.

In an example, the recommendation engine may consider the availability of an item (e.g., out of stock). In particular, an item may have been determined as of interest to the user. Upon determining that this item is out of stock, the recommendation engine may determine a corresponding substitute item (e.g., of a same type but from a different supplier) and may rank this item as having the same level of interest or a lower level of interest than the original item.

At operation 706, the computer system may generate a list that groups the items of interest under the categories of interest. In an example, the list may include a category ranking of the categories of interest. The list may also include an item ranking of items that are grouped under a same category. For instance, the category ranking corresponds to the user's interest level in the categories and the item ranking corresponds to the user's interest level in the items within each category. Generally, regular categories may be ranked higher than discovered categories. Also, usual items may be ranked higher than substitute items that, in turn, may be ranked higher than discovered items. A first category ranked higher than a second category may correspond to the user's relatively higher interest in the first category as determined from the user item purchase history and/or the histories of the other users. Similarly, a first item ranked higher than a second item within a same category may correspond to the user's relatively higher interest in the first item as determined from the user item purchase history and/or the histories of the other users.

At operation 708, the computer system may receive a user utterance requesting an item interaction session. In an example, the user utterance may also include a wakeword defined for a user device of the computer system. The user device may receive the user utterance, detect the wakeword, and generate and send audio data representing the user utterance to a backend system of the computer system.

At operation 710, the computer system may generate TTS content from the list. In an example, the TTS content may be generated based on the natural language processing of the user utterance, where this processing may indicate a user intent for an item interaction. The backend system and the user device may establish a communication session that represent the item interaction session. The TTS content may include category information and item information. The category information may identify the personalized categories, including regular and discovered categories, in an ordered sequence according to the category ranking. The item information may identify, for each of the personalized categories, the items that are grouped under the personalized category, including usual, substitute, and discovered items, in an ordered sequence according to the item ranking.

At operation 712, the computer system may present the category information and the item information from the TTS content. In an example, the backend system may provide the TTS content to the user device for presentation to the user. The user device may present a category according to the ordered sequence of the categories and may present, under each category, items according to the ordered sequence of the items belonging to the category. Hence, the category of most interest to the user may be identified to the user first. Prior to identifying the next categories, the usual items belonging to this category may be identified to the user followed by the substitute items according the item rankings. A prompt may be presented to the user asking whether discovered items should be presented. If so, the discovered items belonging to the category may be presented. Otherwise, the presentation proceeds to the next category.

At operation 714, the computer system may add an identifier of an item to an item checkout process. In an example, upon presenting the item to the user, the user device may send presentation data to the backend system indicating the presentation. The backend system may automatically add the identifier of the item to the checkout process. Of course, user utterances may be received and processed to edit or remove the items added to the item check out process, to request discovered categories, or to request information about items and/or categories that have not been discovered. Audio data about such user utterances may be analyzed to update the TTS content and/or the checkout process as applicable. Examples of this processing are further illustrated in the next figures.

Figure 8:
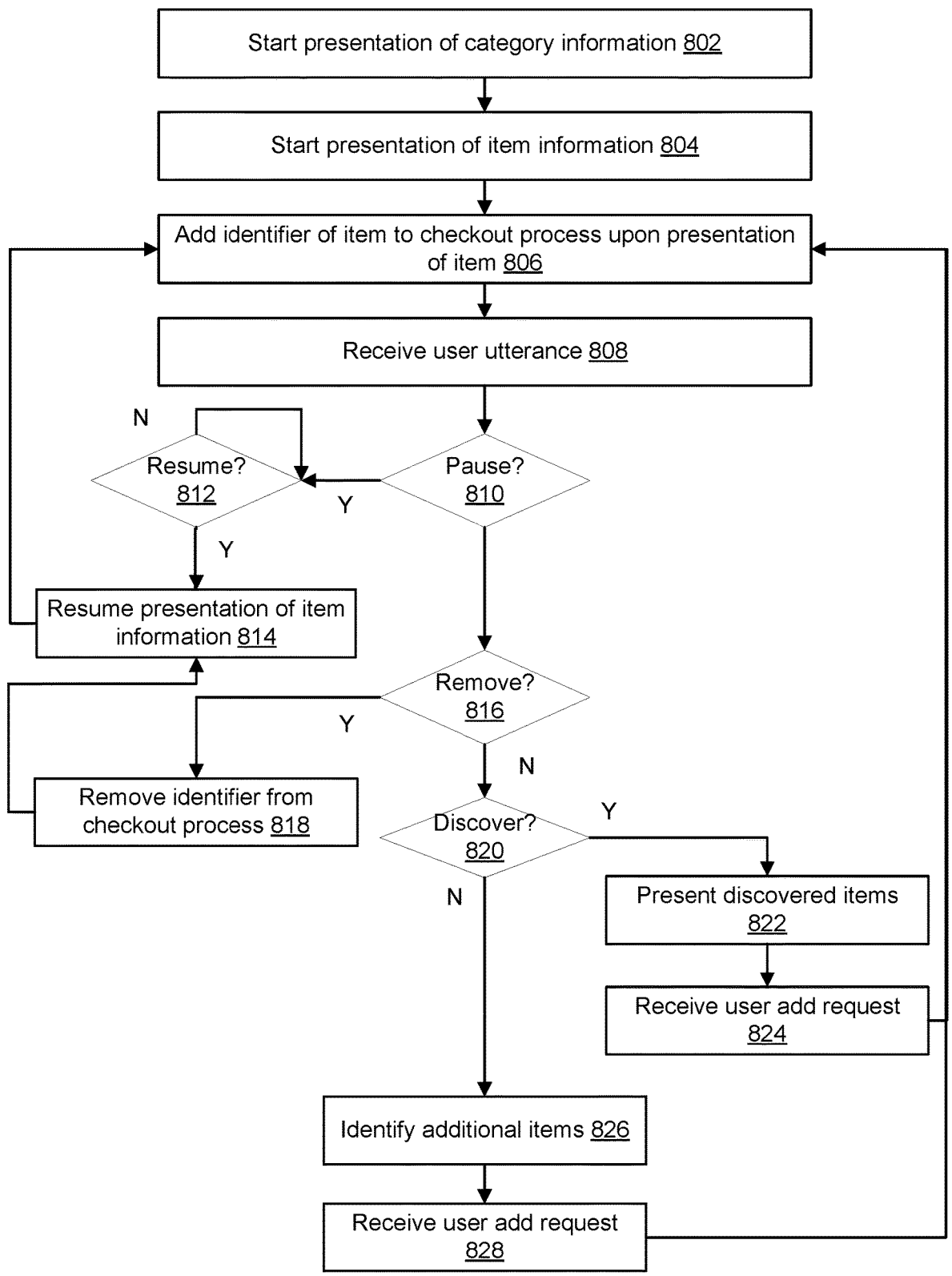
FIG. 8 illustrates an example flow for processing user interactions in an item interaction session, in accordance with various embodiments.

FIG. 8 illustrates an example flow for processing user interactions in an item interaction session, in accordance with various embodiments. The operations of this flow may be implemented as sub-operations of flow of FIG. 7.

In an example, the example flow of FIG. 8 may start at operation 802, where the computer system may start a presentation of category information. In an example, the user device may present a category to the user depending on the category ranking.

At operation 804, the computer system may start a presentation of item information. In an example, the user device may present an item from the category to the user depending on the item ranking.

At operation 806, the computer system may add an identifier of the item to an item checkout process upon the presentation of the item. In an example, the user device may send presentation data to the backend system indicating that the item was presented. In turn, the backend system may send the identifier of the item to the item checkout process.

At operation 808, the computer system may receive a user utterance. In an example, the user device may detect a wakeword from the user utterance and, in response, generate and send audio data representing the user utterance to the backend system. The backend system may apply ASR processing to the audio data to generate text data and may apply NLU processing to the text data to determine a user intent.

At operation 810, the computer system may determine whether the user intent is to pause the dialog. If so, operation 812 may be performed. Otherwise, operation 816 may be performed.

At operation 812, the computer system may play the dialog and wait for another user utterance to resume the dialog. Accordingly, upon receiving a next user utterance, the computer system may process the corresponding audio data to determine whether the user intent is now to resume the dialog. If so, operation 818 may be performed. Otherwise, operation 812 may be performed again until a user intent to receive the dialog is determined.

At operation 814, the computer system may resume the presentation of item information. For example, the user device may continue the dialog by presenting items from the category according to the item ranking. Operation 806 may follow operation 814, where any time the user device may present a particular item, that particular item may be added to the item checkout process.

At operation 816, the computer system may have determined that the received user utterance is not for pausing the dialog. The computer system may determine whether the user intent is instead to remove the item from the item checkout process (or, similarly, edit this item). If so, operation 818 may be performed. Otherwise, operation 820 may be performed.

At operation 818, the computer system may remove the identifier of the item from the item checkout process upon a determination that the user intent is for the removal (or, similarly, may edit this item in the item checkout process if the user intent is for changing the quantity and/or supplier). Upon the removal, the user device may present TTS content confirming that the item was removed (or, similarly, that the item was edited). Operation 814 may follow operation 818, where the user device may resume the presentation of the item information.

At operation 820, the computer system may have determined that the received user utterance is not for removal or edit of the item. The computer system may determine whether the user intent is instead to discover an item. If so, operation 822 may be performed. Otherwise, operation 826 may be performed.

At operation 822, the computer system may present discovered items. For example, information about discovered items belonging to the same category may be available from the item information. The user device may present one or more of the discovered items based on the item ranking of these items within the category.

At operation 824, the computer system may receive a user add request. For example, a user utterance may be received and the corresponding audio data may be processed to determine that the user intent is to add a discovered item. Accordingly, the computer system may perform operation 806 to send an identifier of the discovered item to the item checkout process.

At operation 826, the computer system may have determined that the received user utterance is not for item discovery. Accordingly, the computer system may determine that the user may be requesting information about items that are not usual items and that are not discovered items that belong to the category. In this case, the backend system may request additional recommended items that belong to the category from the recommendation engine and may generate and send TTS content about such items to the user device. In turn, the user device may present one or more of the additional items to the user.

At operation 828, the computer system may receive a user add request. For example, a user utterance may be received and the corresponding audio data may be processed to determine that the user intent is to add an additional item. Accordingly, the computer system may perform operation 806 to send an identifier of the additional item to the item checkout process.

Figure 9:
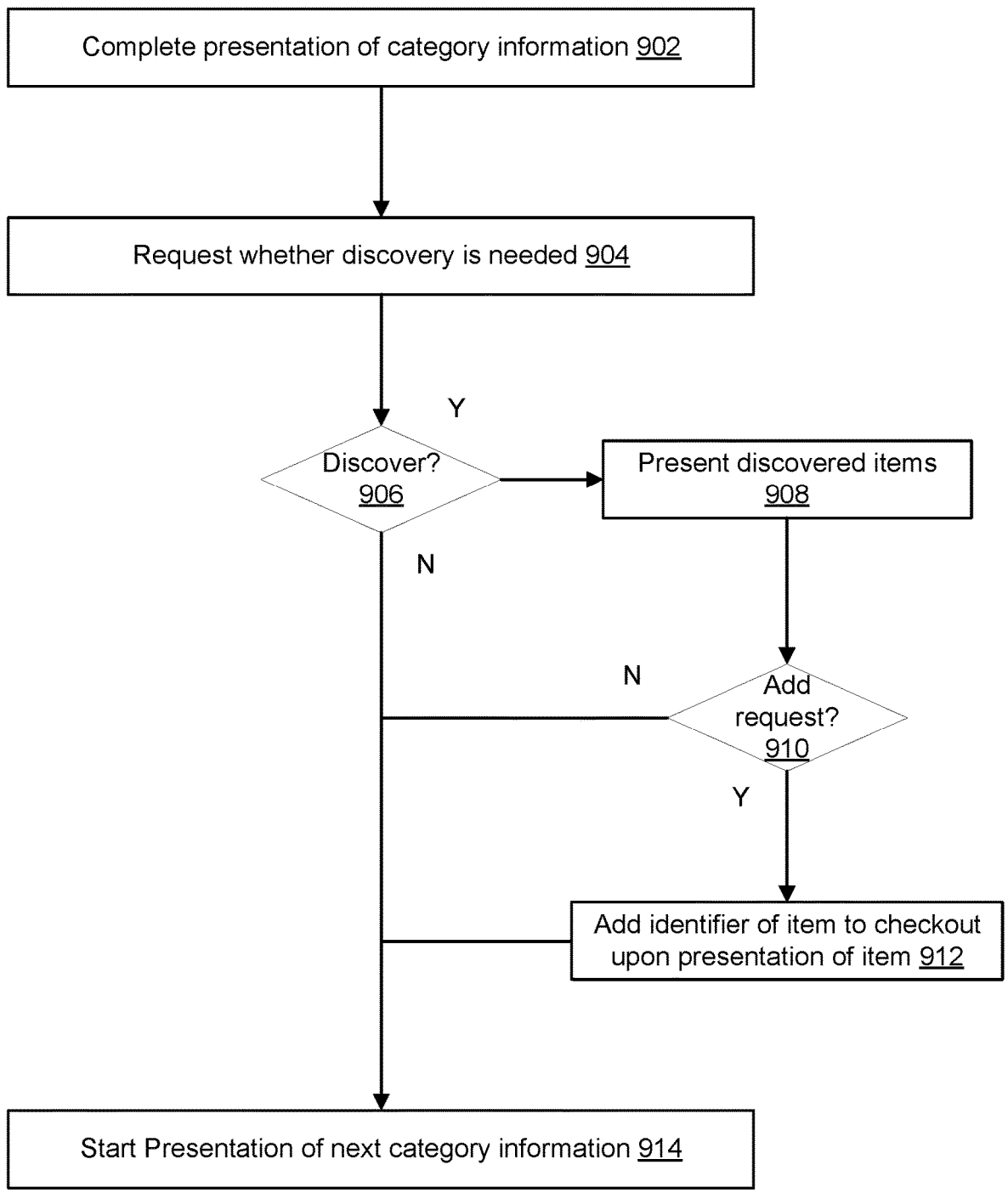
FIG. 9 illustrates an example flow for processing user interactions to discover items in an item interaction session, in accordance with various embodiments.

FIG. 9 illustrates an example flow for processing user interactions to discover items in an item interaction session, in accordance with various embodiments. The operations of this flow may be implemented as sub-operations of flow of FIG. 7.

In an example, the example flow of FIG. 9 may start at operation 902, where the computer system may complete presentation of category information. In an example, this information may correspond to a regular category. Completing the presentation may correspond to an end of the presentation about all the usual and substitute items under this regular category.

At operation 904, the computer system may request whether a discovery is needed. For example, the user device may present a prompt asking the user if they would like to receive information about discovered items.

At operation 906, the computer system may determine whether an item discovery has been requested upon receiving a user utterance. In an example, the user device may generate and send audio data representing the user utterance to the backend system. The backend system may apply ASR processing to the audio data to generate text data and may apply NLU processing to the text data to determine a user intent. The backend system may determine whether the user intent is to discover items. If so, operation 908 may be performed. Otherwise, operation 914 may be performed.

At operation 908, the computer system may present discovered items. For example, the discovered items may belong to the regular category. The user device may present one or more of the discovered items based on the item ranking of these items within the regular category.

At operation 910, the computer system may determine whether a user add request was made. For example, a user utterance may be received and the corresponding audio data may be processed to determine the user intent. If the user intent is to add a discovered item, operation 912 may be performed. Otherwise operation 914 may be performed.

At operation 912, the computer system may add an identifier of the discovered item to the item checkout process. For example, send an identifier of the discovered item to the item checkout process.

At operation 914, the computer system may start a presentation of a next category information. In an example, this information may correspond to another regular category and this category may be selected based on the category ranking.

Figure 10:
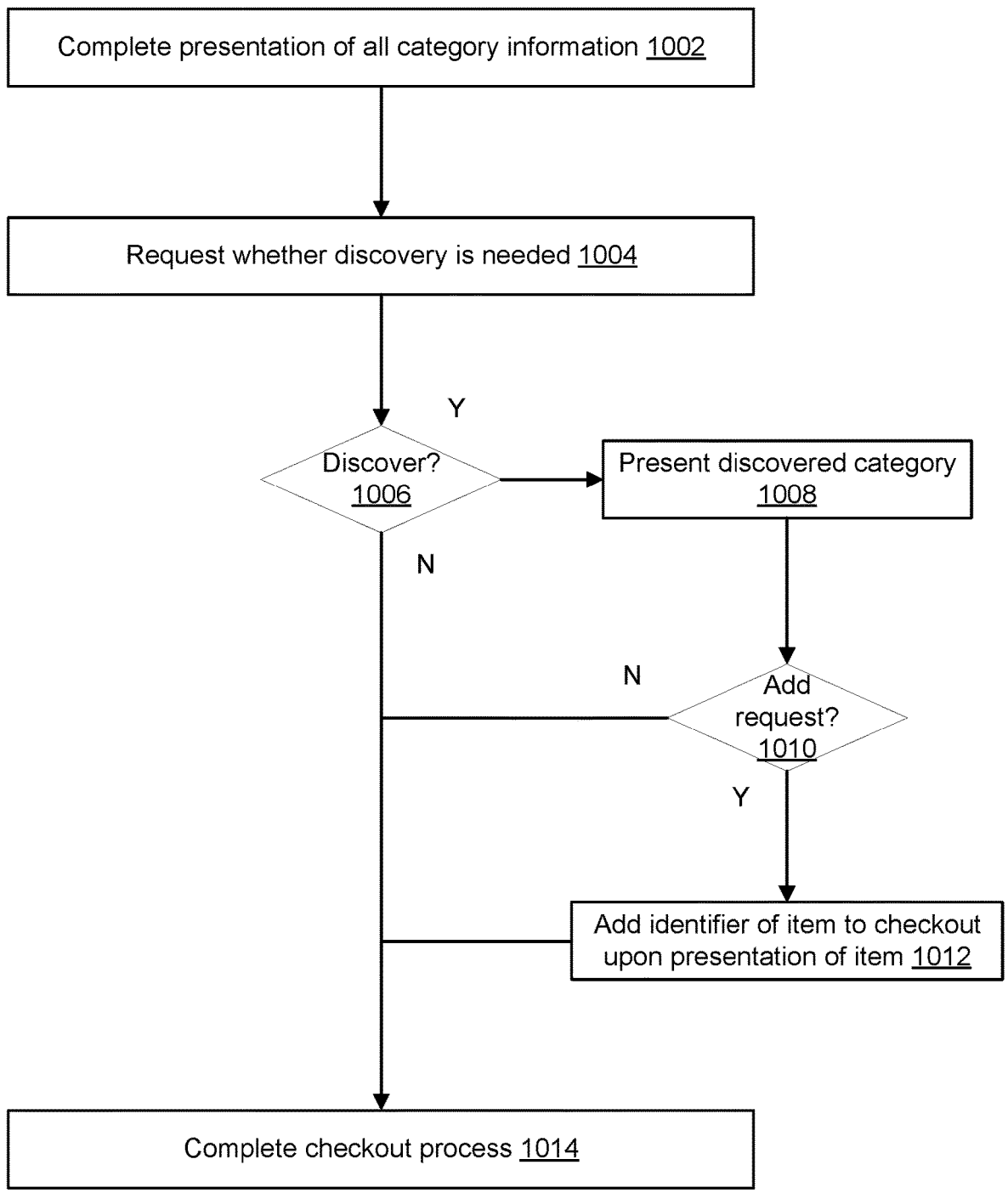
FIG. 10 illustrates an example flow for processing user interactions to discover categories in an item interaction session, in accordance with various embodiments.

FIG. 10 illustrates an example flow for processing user interactions to discover categories in an item interaction session, in accordance with various embodiments. The operations of this flow may be implemented as sub-operations of flow of FIG. 7.

In an example, the example flow of FIG. 10 may start at operation 1002, where the computer system may complete presentation of all category information. In an example, completing the presentation may correspond to an end of presenting information available about the regular categories.

At operation 1004, the computer system may request whether a discovery is needed. For example, the user device may present a prompt asking the user if they would like to receive information about discovered categories.

At operation 1006, the computer system may determine whether a category discovery has been requested upon receiving a user utterance. In an example, the user device may generate and send audio data representing the user utterance to the backend system. The backend system may apply ASR processing to the audio data to generate text data and may apply NLU processing to the text data to determine a user intent. The backend system may determine whether the user intent is to discover categories. If so, operation 1008 may be performed. Otherwise, operation 1014 may be performed.

At operation 1008, the computer system may present discovered categories. For example, a discovered category may be presented first based on its corresponding category ranking before the presentation of a next discovered category. Presenting the discovered category may include presenting discovered items belonging to the discovered category.

At operation 1010, the computer system may determine whether a user add request was made. For example, a user utterance may be received and the corresponding audio data may be processed to determine the user intent. If the user intent is to add a discovered item, operation 1012 may be performed. Otherwise operation 1014 may be performed.

At operation 1012, the computer system may add an identifier of the discovered item to the item checkout process. For example, send an identifier of the discovered item to the item checkout process.

At operation 1014, the computer system may complete the item checkout process. In an example, the computer system may generate a purchase order for the items added to the item checkout process and may associate the purchase order with the user account.

Figure 11:
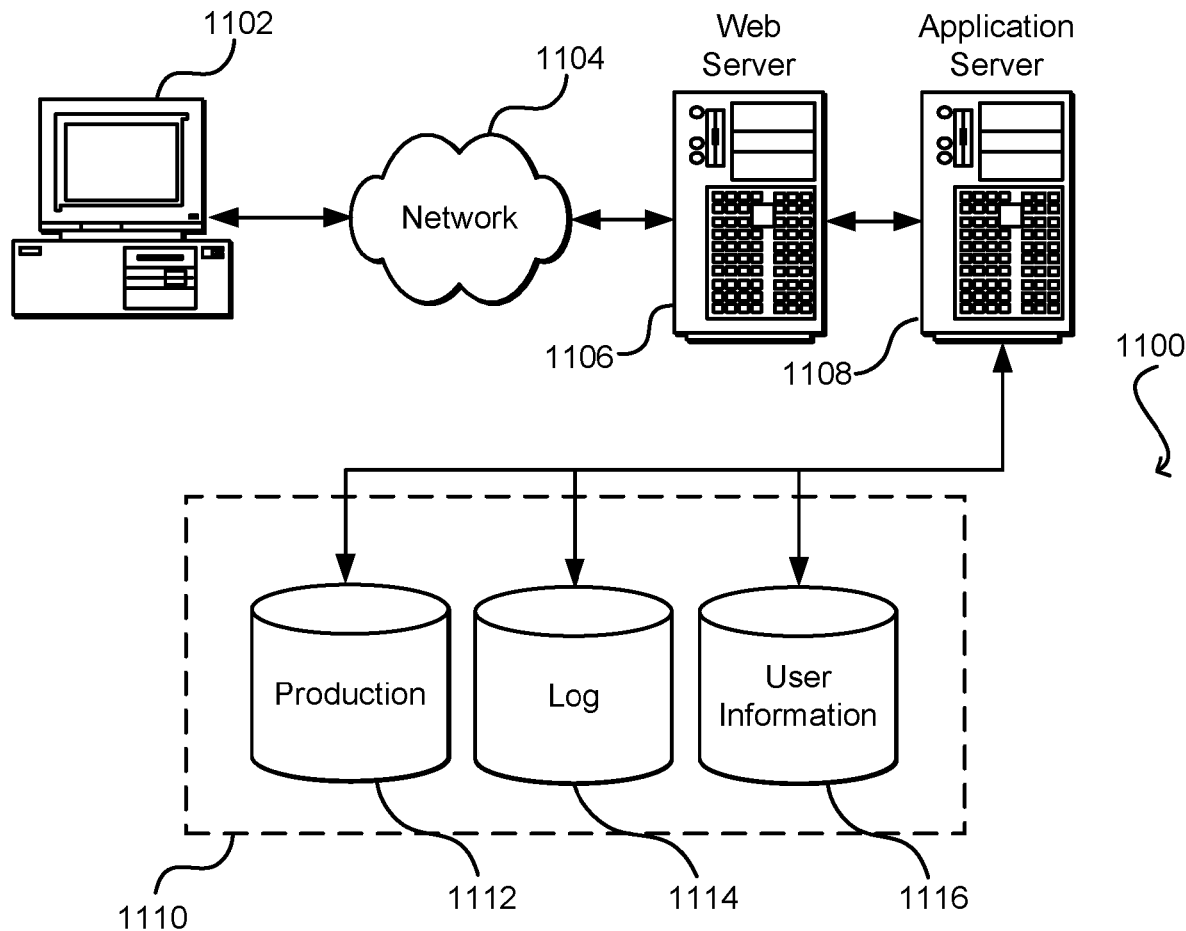
FIG. 11 illustrates an environment in which various embodiments can be implemented.

FIG. 11 illustrates an environment 1100 in which various embodiments can be implemented. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method implemented by a computer system that includes a natural language processing system and a voice-based user device, the method comprising:
generating, from a standard taxonomy of predefined categories, a personalized taxonomy for a user based at least in part on an item purchase history of the user, the personalized taxonomy comprising categories of interest to the user;
identifying items of interest to the user from available items based at least in part on the item purchase history of the user, the available items being grouped in the predefined categories of the standard taxonomy;

generating, prior to a user utterance, a list that groups the items of interest under the categories of interest, the list indicating a first ranking of the categories of interest, the list further indicating a second ranking of items that are from the items of interest and that are grouped under a first category of the categories of interest;

receiving the user utterance that includes a wakeword associated with the voice-based user device and that requests an item interaction session;

generating, based at least in part on natural language processing of the user utterance, text-to-speech content from the list, the text-to-speech content comprising category information and item information, the category information identifying the first category based at least in part on the first ranking, the item information identifying a first item from the first category based at least in part on the second ranking;

presenting, in the item interaction session, the category information and the item information from the text-to-speech content; and adding an identifier of the first item to an item checkout process upon the presentation of the item information.

2. The method of claim 1, further comprising:

receiving, in the item interaction session, a second user utterance requesting a removal of the first item;

pausing a presentation of the text-to-speech content;

removing the identifier of the first item from the item checkout process;

presenting, in the item interaction session, a confirmation of the removal; and resuming, in the item interaction session, the presentation of the text-to-speech content after the presentation of the confirmation.

3. The method of claim 1, wherein the first category comprises a second item, wherein the item information identifies the first item and the second item in an ordered sequence based at least in part on the second ranking, and wherein presenting the item information comprises:

identifying the first item and the second item to the user based at least in part on the ordered sequence.

4. The method of claim 1, wherein the categories of interest comprise a second category, wherein the category information identifies the first category and the second category in an ordered sequence based at least in part on the first ranking, and wherein presenting the category information comprises:

identifying, based at least in part on the ordered sequence, the second category after the presentation of the item information.

5. A computer system comprising:

one or more processors;

one or more non-transitory computer-readable storage media storing instructions, that upon execution by the one or more processors, configure the computer system to:

generate, from a first taxonomy, a second taxonomy for a user based at least in part on an item purchase history of the user, the second taxonomy comprising categories;

identify items based at least in part on the item purchase history of the user;

generate a list that associates the items with the categories;

generate, based at least in part on a user utterance requesting an item interaction session, text-to-speech content from the list, the text-to-speech content comprising category information and item information, the category information identifying a first category from the categories, the item information identifying a first item from the items, the first item associated with the first category;

cause, in the item interaction session, a presentation of the category information and a presentation of the item information from the text-to-speech content; and add an identifier of the first item to an item checkout process based at least in part on the presentation of the item information.

6. The computer system of claim 5, wherein the items are items of interest to the user and are identified from available items that are organized in the first taxonomy, wherein the list indicates a first ranking of the categories and a second ranking of first items grouped in the first category, wherein the category information identifies the first category based at least in part on the first ranking, and wherein the item information identifies the first item from the first items based at least in part on the second ranking.

7. The computer system of claim 5, wherein the list identifies that the first category is of a higher level of interest to the user than a second category and that the first item is of a higher level interest to the user than a second item from the first category, wherein the presentation of the category information comprises presenting the first category prior to presenting the second category based at least in part on the list, wherein the presentation of the item information comprises presenting the first item prior to presenting the second item based at least in part on the list, and wherein the second category is presented after the presentation of the item information based at least in part on the list.

8. The computer system of claim 7, wherein the item checkout process comprises identifiers of the items from the list upon completion of an uninterrupted presentation of the category information and the item information.

9. The computer system of claim 5, wherein the list identifies a quantity and a supplier of the first item based at least in part on the item purchase history, wherein the item information identifies the quantity and the supplier, and wherein the presentation of the item information comprises presenting the quantity and the supplier to the user.

10. The computer system of claim 5, wherein the execution of the instructions further configures the computer system to:

determine that a second item from the items is unavailable and is associated with the first category;

identify a substitute item based at least in part on the second item; and update the list to associate the substitute item with the first category and rank the substitute item lower than the first item, wherein the presentation of the item information comprises presenting the first item before presenting the substitute item to the user based at least in part on the list.

11. The computer system of claim 5, wherein the execution of the instructions further configure the computer system to:

identify a potential item of interest to the user based at least in part on item purchase histories of other users;

update the list to associate the potential item of interest with the first category;

after the presentation of the item information, cause a presentation of a request to the user about whether to present potential items of interest from the first category; and cause a presentation of the potential item of interest based at least in part on another user utterance requesting the presentation of the potential items of interest.

12. The computer system of claim 5, wherein the execution of the instructions further configure the computer system to:

identify a potential item of interest to the user based at least in part on item purchase histories of other users;

determine, from the first taxonomy, a second category that includes the potential item of interest, the second category being a potential category of interest to the user;

update the list to include the potential category of interest;

after the presentation of the category information, cause a presentation of a request to the user about whether to present potential categories of interest; and cause a presentation of the potential category of interest and the potential item of interest based at least in part on another user utterance requesting the presentation of the potential categories of interest.

13. The computer system of claim 12, wherein the potential item of interest is determined based on a first context common to the user and the other users, wherein the execution of the instructions further configures the computer system to:

receive, after the presentation of the potential category, audio data about another user utterance requesting additional categories;

identify, in response to the other user utterance, an additional item based at least in part on a second context of the user; and cause a presentation of the additional item.

14. One or more non-transitory computer-readable storage media storing instructions, that upon execution on a computer system, cause the computer system to perform operations comprising:

generating, from a first taxonomy, a second taxonomy for a user based at least in part on an item purchase history of the user, the second taxonomy comprising categories;

identifying items based at least in part on the item purchase history of the user;

generating a list that associates the items with the categories;

generating, based at least in part on a user utterance requesting an item interaction session, text-to-speech content from the list, the text-to-speech content comprising category information and item information, the category information identifying a first category from the categories, the item information identifying a first item from the items, the first item associated with the first category;

causing, in the item interaction session, a presentation of the category information and a presentation of the item information from the text-to-speech content; and adding an identifier of the first item to an item checkout process based at least in part on the presentation of the item information.

15. The one or more non-transitory computer-readable storage media of claim 14, wherein the operations further comprise:

determining that a second identifier of a second item on the list is already added to the item checkout process, wherein generating the text-to-speech content comprises excluding information about the second item from the text-to-speech content based at least in part on the second identifier being already added to the item checkout process.

16. The one or more non-transitory computer-readable storage media of claim 14, wherein the operations further:

identifying a potential item of interest to the user based at least in part on item purchase histories of other users; and determining that a second identifier of the potential item of interest is already added to the item checkout process, wherein generating the text-to-speech content comprises excluding information about the potential item of interest from the text-to-speech content based at least in part on the second identifier being already added to the item checkout process.

17. The one or more non-transitory computer-readable storage media of claim 14, wherein the operations further comprise:

identifying a potential item of interest to the user based at least in part on item purchase histories of other users;

determining, from the first taxonomy, a second category that includes the potential item of interest, the second category being a potential category of interest to the user; and updating the second taxonomy to include the second category.

18. The one or more non-transitory computer-readable storage media of claim 14, wherein generating the list comprises:

determining that the first item belongs to a second category of the first taxonomy;

determining an association between the first category of the second taxonomy and the second category of the first taxonomy based at least in part on a mapping between the first taxonomy and the second taxonomy; and grouping the first item under the first category of the second taxonomy based at least in part on the association.

19. The one or more non-transitory computer-readable storage media of claim 14, wherein identifying the items comprises determining that the first item is an item of interest to the user based at least in part on a portion of the item purchase history of the user, wherein the portion is based at least in part on an availability timeframe of the first item.

20. The one or more non-transitory computer-readable storage media of claim 14, wherein the operations comprise:

updating the item purchase history of the user to include the identifier of the first item based at least in part on a completion of the item checkout process; and updating the second taxonomy based at least in part on the updated item purchase history.

* * * * *